(12) United States Patent
Bontems

(10) Patent No.: US 7,114,667 B1
(45) Date of Patent: Oct. 3, 2006

(54) NOZZLE COUPLING

(76) Inventor: Thomas A. Bontems, 1909 E. Palmcroft Dr., Tempe, AZ (US) 85282

( * ) Notice: Subject to any disclaimer, the term of this patent is extended or adjusted under 35 U.S.C. 154(b) by 85 days.

(21) Appl. No.: 10/845,902

(22) Filed: May 14, 2004

Related U.S. Application Data

(63) Continuation of application No. 09/992,112, filed on Nov. 6, 2001, now abandoned.

(51) Int. Cl.
  *B05B 1/14* (2006.01)
(52) U.S. Cl. .................. 239/550; 239/207; 239/208; 239/266; 239/273; 239/397; 239/565; 239/600
(58) Field of Classification Search ............ 239/200, 239/207, 208, 209, 266, 272, 273, 397, 547, 239/550, 565, 566, 600
See application file for complete search history.

(56) References Cited

U.S. PATENT DOCUMENTS

| | | | | |
|---|---|---|---|---|
| RE31,495 E | * | 1/1984 | Zublin | 239/397 |
| 5,651,502 A | * | 7/1997 | Edwards | 239/550 |
| 5,862,987 A | * | 1/1999 | Reif | 239/209 |
| 6,015,099 A | * | 1/2000 | Ducey | 239/266 |
| 6,315,219 B1 | * | 11/2001 | Palestrant | 239/550 |

* cited by examiner

*Primary Examiner*—Steven J. Ganey
(74) *Attorney, Agent, or Firm*—Parsons & Goltry; Robert A. Parsons; Michael W. Goltry

(57) ABSTRACT

A nozzle coupling includes a connector having an attached nozzle and opposing ends. The connector is capable of receiving fluid and conducting it to the nozzle and the nozzle is capable of receiving fluid from the connector and spraying it outwardly therefrom. Facets of the connector extend longitudinally of the connector from one of the opposing ends to the other of the opposing ends, and each of the facets are capable of being borne against a surface to locate the nozzle.

11 Claims, 2 Drawing Sheets

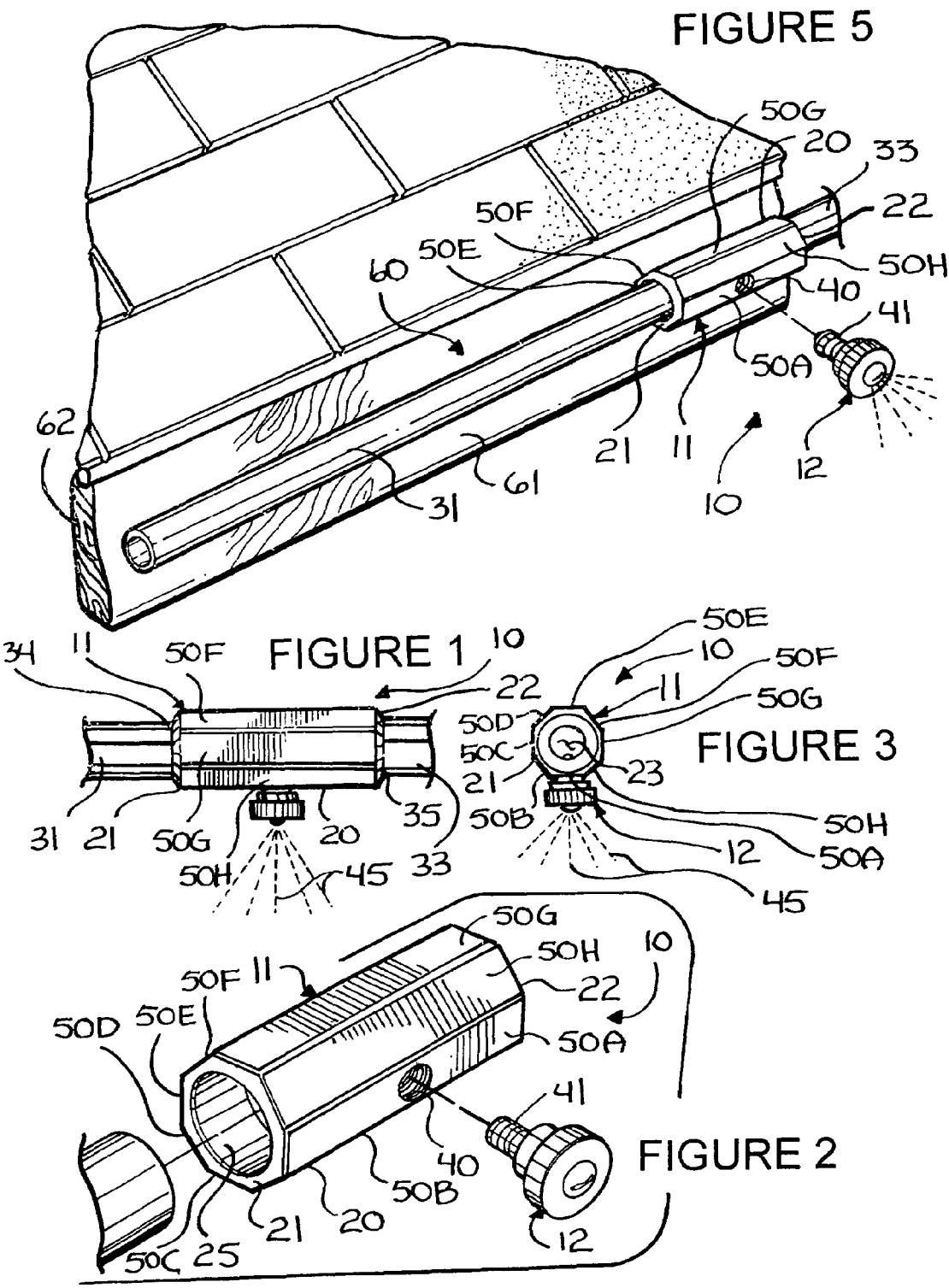

US 7,114,667 B1

NOZZLE COUPLING

This application is a continuation of application Ser. No. 09/992,112, filed 6 Nov. 2001 now abandoned.

FIELD OF THE INVENTION

This invention relates to misting systems and to nozzle couplings for use with misting systems.

BACKGROUND OF THE INVENTION

Misting systems are popular in hot and dry climates where the rapid evaporation of mist is capable of quickly and efficiently cooling outdoor areas, such as private and commercial patios, outdoor seating areas, outdoor restaurants, etc. A problem with existing misting is that it is difficult to fix and alter the direction of the mist spray.

Thus, there is a need for a new and improved misting system and, more particularly, for a new and improved nozzle coupling for use with a misting system that is inexpensive, easy to construct and maintain, and that is capable of directing mist in predetermined directions.

SUMMARY OF THE INVENTION

Briefly stated, disclosed is a nozzle coupling including a connector having opposing ends and a channel bound by the connector that is capable of being coupled in fluid communication to a fluid source. A nozzle is attached to the connector between the opposing ends in fluid communication with the channel to receive fluid from the channel and spray it outwardly from the channel. Adjacent exterior facets of the connector extend longitudinally of the connector from one of the opposing ends to the other of the opposing ends. The facets define different planes. The nozzle is located at one of the facets, and the remaining facets are considered disposed apart from the nozzle. The facets each provide seating points that are each capable of being borne against a surface for causing the nozzle to direct mist in a predetermined direction. The facets are flat, and addressing one of them against a surface fixes the connector in place against, and inhibits the connector from rotating against, the surface against which it bears. This holds true for each of the facets. An engagement assembly attaches the nozzle to the connector that includes an engagement element carried by the nozzle and a detachably engaged complemental engagement element carried by the connector. Preferably, the engagement element is a threaded element and the complemental engagement element is a complement threaded element, and this can be reversed. The channel extending through the connector is characterized by a passage that communicates with opposing counterbores disposed at the opposing ends that are each capable of connector a fluid conducting conduit.

BRIEF DESCRIPTION OF THE DRAWINGS

Referring to the drawings:

FIG. 1 is a side elevation of a nozzle coupling, in accordance with the principle of the invention, the nozzle coupling including a connector having ends coupled in fluid communication to fluid conducting conduits and an attached nozzle for receiving fluid from the connector and spraying it outwardly therefrom;

FIG. 2 is an exploded isometric view of the nozzle coupling of FIG. 1;

FIG. 3 is an end elevation of the nozzle coupling of FIG. 1;

FIG. 5 is a view of the nozzle coupling of FIG. 1 shown as it would appear incorporated into a misting system.

DETAILED DESCRIPTION OF A PREFERRED EMBODIMENT

Figure 4:
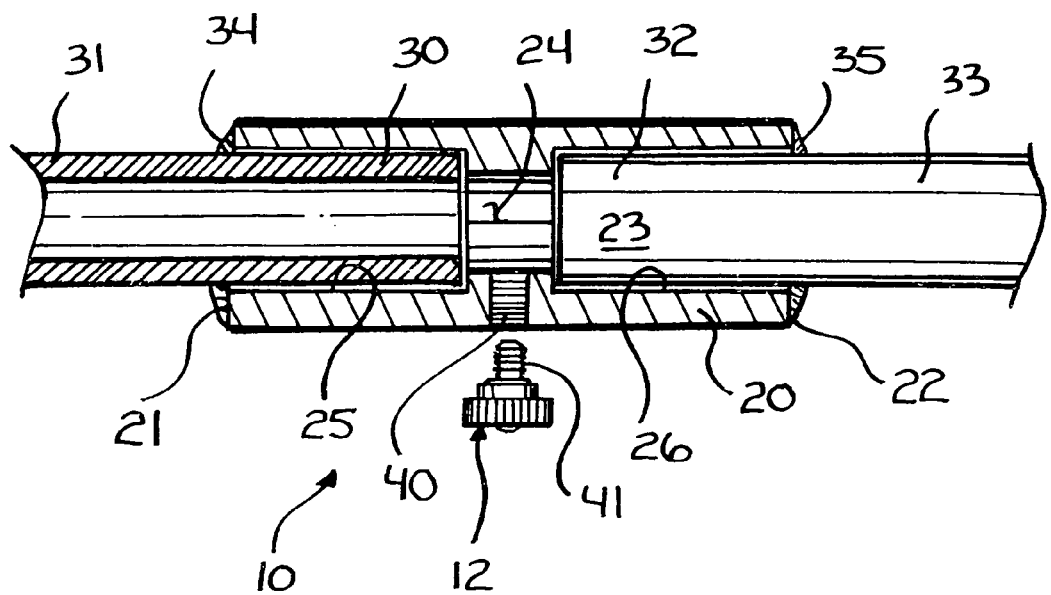
FIG. 4 is a sectional view of the connector taken along line 4—4 of FIG. 1 with the nozzle shown detached therefrom.

Turning now to the drawings, in which like reference characters indicate corresponding elements throughout the several views, attention is first directed to FIG. 1 in which is seen a side elevation of a nozzle coupling, embodying the principle of the instant invention, generally indicated by the reference character 10 and including a connector 11 and an attached nozzle 12. Connector 11 is fashioned from plastic, brass, stainless steel or aluminum with brass being preferred and other materials can be used if desired. Connector 11 is integrally fashioned by machining stock or by molding with the former being preferred. Connector 11 can also be assembled from two or more prefabricated parts with welding, adhesive, etc.

Turning to FIG. 4, which is a sectional view taken along line 4—4 of FIG. 1, connector 11 is an elongate tubular body 20 having opposing open ends 21,22. Body 20 bounds a channel 23, which extends longitudinally therethrough from end 21 to end 22. In this embodiment, channel 23 is characterized by an intermediate passage 24 that communicates with opposing counterbores 25,26. Counterbore 25 is capable of receiving an end 30 of a fluid conducting conduit 31 and counterbore 26 is capable of receiving an end 32 of a fluid conducting conduit 33. The outer diameters of ends 30,32 of conduits 31,33 are somewhat smaller that the inner diameters of counterbores 25,26, respectively, which permits counterbores 25,26 to receive ends 30,32, respectively, providing a relatively snug fit. Beads 34,35 of adhesive or solder are applied between ends 21,22 and the outer surfaces of conduits 31,32, respectively, providing a substantially fluid-tight seal between ends 21,22 and conduits 31,33. Conduits 31,33 can be attached to connector 11 in fluid communication with channel 24 in other ways, which will readily occur to the skilled artisan.

A threaded bore 40 extends inwardly through body 20 at passage 24 and communicates with passage 24. Further to FIG. 2, nozzle 12 has a threaded end 41 that complements threaded bore 40 and is capable of being threadably received by and removed from threaded bore 40 in a conventional manner. Although threaded features represent a preferred attachment assembly for detachably coupling nozzle 12 to connector 11, snap features, press fitting and other suitable manners of detachable engagement can be employed. Nozzle 12 can also be fixed to connector if desired or adhesively attached. As shown in FIG. 1, nozzle 12 attaches to body 20 between ends 21,22. Nozzle 12 is a conventional misting nozzle that is capable of receiving fluid proximate end 41 from passage 24 and spraying it outwardly from its opposing end in the form of mist. So when attached to body 20 as in FIGS. 1 and 3, nozzle 12 is attached to connector 11 between ends 21,22 in fluid communication with channel 23 (FIG. 4) to receive fluid from channel 23 and spray it outwardly therefrom in the form of mist 45.

Conduits 31,33 are capable of receiving and conducting fluid from a fluid source. The fluid source is typically a water source, and it is intended that conduit 31 is attached to a water source such as a garden hose or perhaps a dedicated or permanent water supply line. Conduit 33 can be attached to the fluid source instead of conduit 31 if desired. Conduit 31 is capable of delivering water into passage 24 and onward through conduit 33. Although only one nozzle coupling is shown, it is envisioned that a plurality of such nozzle couplings be coupled together in fluid communication with a plurality of conduits or conduit segments upstream and/or downstream of nozzle coupling 10 so as to form a misting system. When such a misting system is charged with pressurized water, it is driven outwardly through the nozzles of the nozzle couplings providing mist. And so when pressurized water passes into passage 24, part of it will be collected by nozzle 12 and sprayed outwardly therefrom in the form of mist 45, which is denoted in FIGS. 1 and 3. Those of ordinary skill will readily appreciate that nozzle coupling 10 may be incorporated into a misting system having the same such nozzle couplings or different forms of nozzle assemblies.

Referring to FIGS. 2 and 3, body 20 includes an outer surface that is characterized by adjacent exterior facets or faces 50A–50H that extend longitudinally of body 11 from end 21 to end 22. As best represented in FIG. 3, body 20 incorporates eight facets and in cross section is octagonal in shape. Facets 50A–50H define different planes and are substantially equally sized. Less or more such facets can be incorporated with body 20 and even one can be provided if desired consistent with the teachings of the invention. Facets 50A–50H can be differently sized if desired depending on specific needs. As shown in FIG. 2, bore 40 extends into facet 50A and nozzle 12 is disposed at facet 50A when attached to connector 11. Facets 50B–50H are disposed apart from nozzle 12 and defined planes that are each different from each other and from facet 50A.

Figure 6:
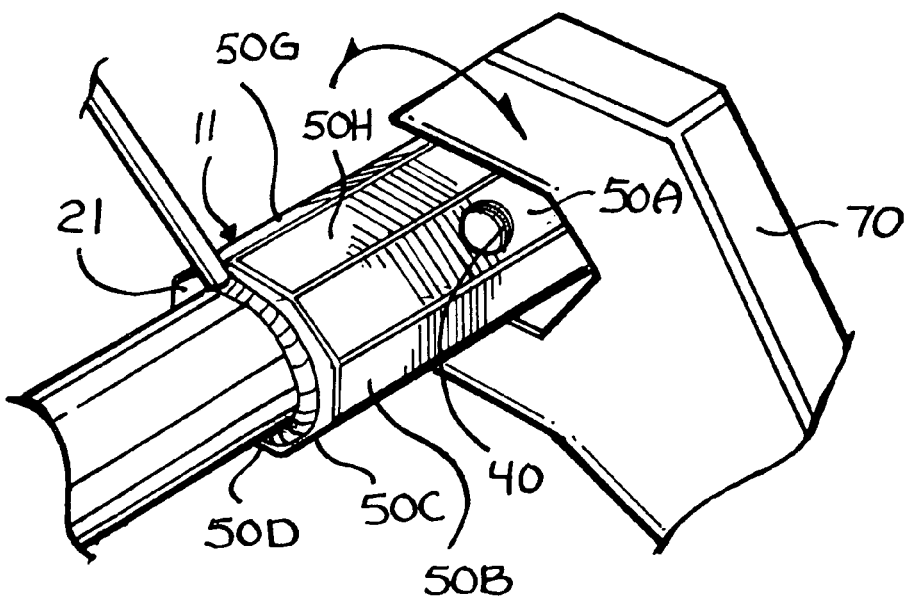
FIG. 6 is an isometric view of the connector of FIG. 1 and a wrench engaging the connector.

In a typical installation as shown in FIG. 5, a misting system 60 incorporating nozzle coupling 10 is secured to a supporting surface 61, such as that provided by an elevated rafter 62 of a building structure. There are many ways to secure a misting system to a surface, with attachment brackets and couplings being the most widely used. When such a misting system is attached, nozzle coupling 10 is directed against surface 61. Facets 50B–50H are very important, because they each provide seating points that are each capable of being borne against surface 61. Because facets 50B–50H are flat, addressing one of them against surface 61 fixes nozzle coupling 10 in place against, and inhibits it from rotating against, surface 61 against which it bears. This arrangement causes nozzle coupling 10 to be fixed in place and causes nozzle 12 to be oriented in a fixed direction thus causing a "locating" of nozzle 12. The terms "locating" and to "locate nozzle" in this respect means fixing of nozzle 12 in a predetermined direction by addressing one of facets 50B–50H against a surface. In FIG. 5, facet 50E is directed against surface 61. Facet 50E opposes and is substantially parallel to facet 50A. Therefore, with facet 50E directed against surface 61, nozzle 12 points directly away from surface 61 and thus directs its expelled mist directly away from surface 61. In order to fix nozzle in other mist-spraying positions, any one of facets 50B–50D and 50F–50H can be born against surface 61. If system 60 incorporates a plurality of nozzle couplings each of a type like that of nozzle coupling 10, they can each be mounted or otherwise born against a surface commonly for directing mist in the same direction or differently for directing mist in different directions. With regard to FIG. 6, the faceted aspect of connector 20 permits it to be engaged with a wrench 70 for turning it. FIG. 6 is further instructive for illustrating bead 34 as it would appear being applied.

The invention has been described above with reference to a preferred embodiment. However, those skilled in the art will recognize that changes and modifications, whether known in the art or novel, may be made to the described embodiment without departing from the nature and scope of the invention, and that positioning of engagement and complemental engagement pairs may be reversed. Accordingly, any such changes and modifications to the embodiment herein chosen for purposes of illustration are intended to be included within the scope of the invention as assessed only by a fair interpretation of the ensuing claims.

Having fully described the invention in such clear and concise terms as to enable those skilled in the art to understand and practice the same, the invention claimed is:

The invention claimed is:

1. Apparatus comprising:
   a connector that bounds a channel that is capable of being coupled in fluid communication to a fluid source;
   the channel includes counterbores formed at opposing ends, each having a diameter and each capable of receiving a fluid conducting conduit, and an intermediate passage that communicates between the opposing counterbores, the intermediate passage having a diameter less than the diameter of the counterbores, wherein an insertion of each of the fluid conducting conduits into the counterbores is stopped by the intermediate passage;
   a nozzle attached to the connector in fluid communication with the channel at the intermediate passage to receive fluid from the channel and spray it outwardly from the channel; and
   an exterior facet of the connector that is capable of being borne against a surface to locate the nozzle.

2. Apparatus of claim 1, wherein the facet is disposed apart from the nozzle.

3. Apparatus comprising:
   a connector that bounds a channel that is capable of being coupled in fluid communication to a fluid source;
   the channel includes counterbores formed at opposing ends, each having a diameter and each capable of receiving a fluid conducting conduit, and an intermediate passage that communicates between the opposing counterbores, the intermediate passage having a diameter less than the diameter of the counterbores, wherein an insertion of each of the fluid conducting conduits into the counterbores is stopped by the intermediate passage;
   a nozzle attached to the connector in fluid communication with the channel at the intermediate passage to receive fluid from the channel and spray it outwardly from the channel; and
   an engagement assembly attaching the nozzle to the connector including an engagement element carried by one of the nozzle and the connector; and
   a detachably engaged complemental engagement element carried by the other of the nozzle and the connector.

4. Apparatus of claim 3, wherein the engagement element comprises one of a threaded element and a complemental threaded element.

5. Apparatus of claim 4, wherein the complemental engagement element comprises the other of the threaded element and the complemental threaded element.

6. Apparatus comprising:
a connector having opposing ends;
a channel bound by the connector and capable of being coupled in fluid communication to a fluid source;
the channel including counterbores formed at the opposing ends, each having a diameter and each capable of receiving a fluid conducting conduit, and an intermediate passage that communicates between the opposing counterbores, the intermediate passage having a diameter less than the diameter of the counterbores wherein an insertion of each of the fluid conducting conduits into the counterbores is stopped by the intermediate passage;
a nozzle attached to the connector between the opposing ends in fluid communication with the channel at the intermediate passage to receive fluid from the channel and spray it outwardly from the channel; and
adjacent exterior facets of the connector that extend longitudinally of the connector from one of the opposing ends to the other of the opposing ends.

7. Apparatus of claim 6, wherein the nozzle is located at one of the facets.

8. Apparatus of claim 6, wherein the facets are disposed apart from the nozzle.

9. Apparatus of claim 6, further including an engagement assembly attaching the nozzle to the connector comprising:
an engagement element carried by one of the nozzle and the connector; and
a detachably engaged complemental engagement element carried by the other of the nozzle and the connector.

10. Apparatus of claim 9, wherein the engagement element comprises one of a threaded element and a complemental threaded element.

11. Apparatus of claim 10, wherein the complemental engagement element comprises the other of the threaded element and the complemental threaded element.

* * * * *